E. M. WHITE.
LUBRICATION CONTROL FOR INTERNAL COMBUSTION ENGINES.
APPLICATION FILED MAR. 1, 1917.
1,238,233.
Patented Aug. 28, 1917.
2 SHEETS—SHEET 1.
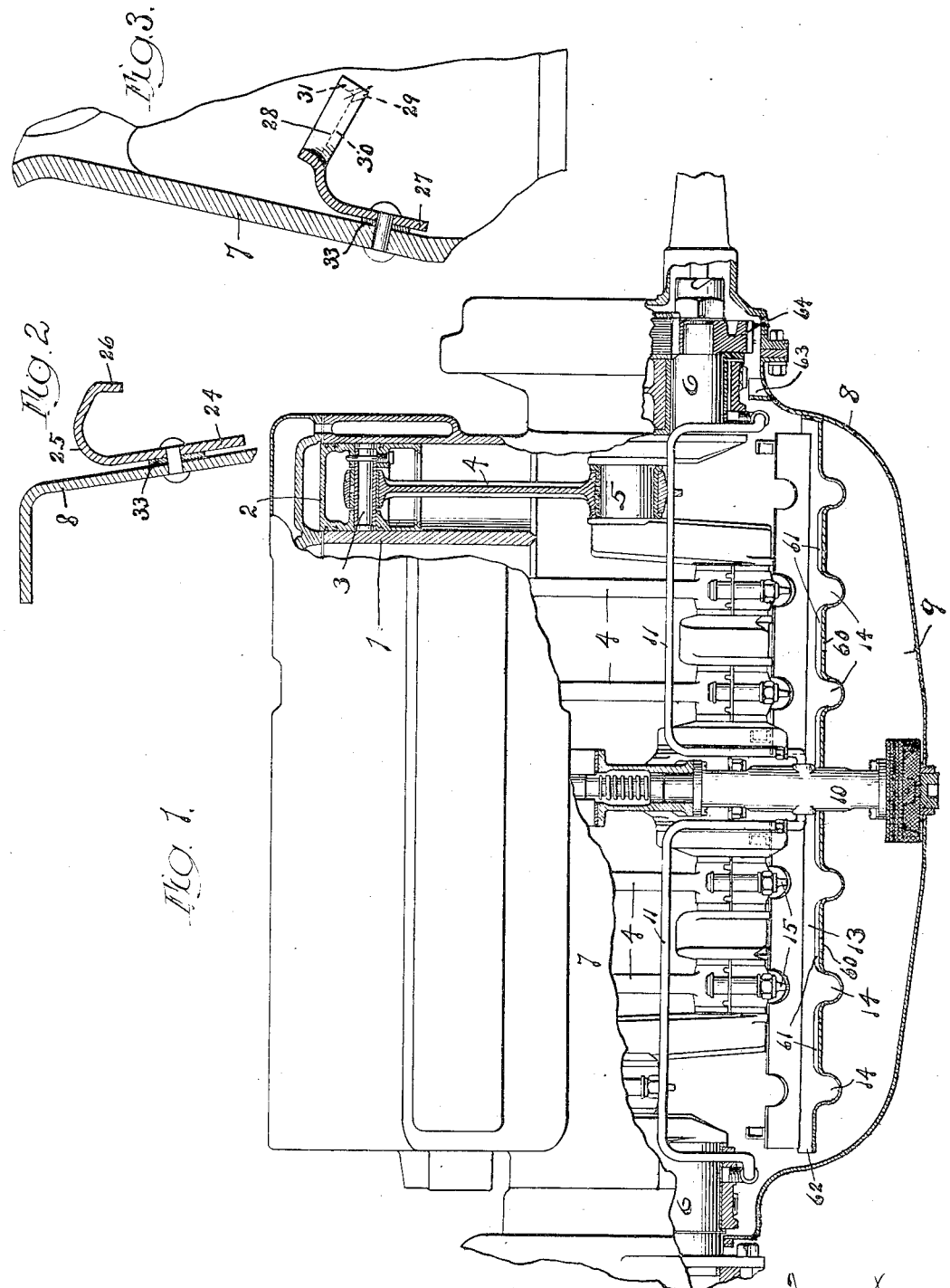

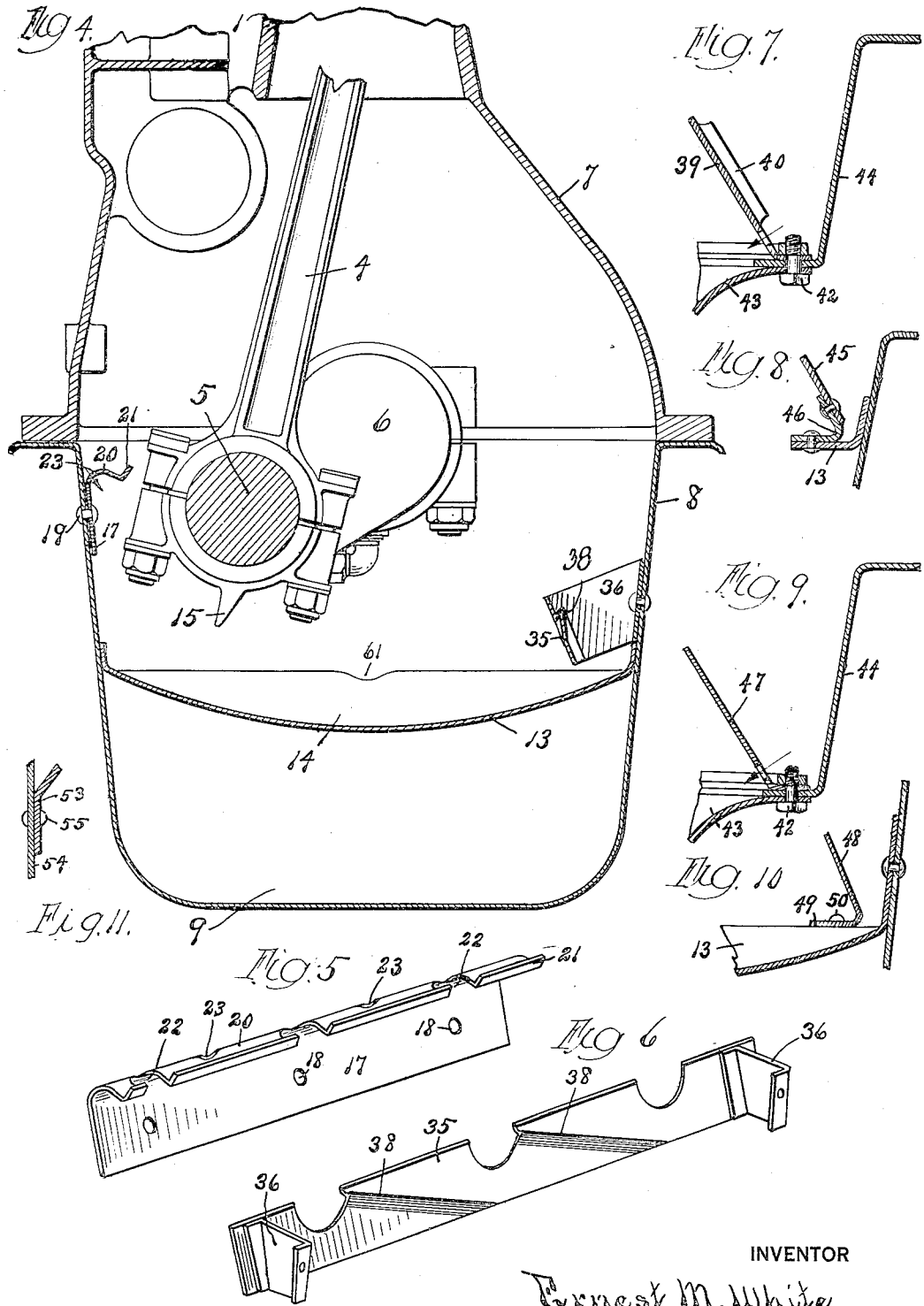

UNITED STATES PATENT OFFICE.

ERNEST M. WHITE, OF DETROIT, MICHIGAN.

LUBRICATION CONTROL FOR INTERNAL-COMBUSTION ENGINES.

1,238,233.

Specification of Letters Patent.

Patented Aug. 28, 1917.

Application filed March 1, 1917. Serial No. 151,645.

*To all whom it may concern:*

Be it known that I, ERNEST M. WHITE, a citizen of the United States, and residing at Detroit, in the county of Wayne and State of Michigan, have invented a new and Improved Lubrication Control for Internal-Combustion Engines, of which the following is a specification.

This invention relates to means for controlling the lubrication of crank shafts, connecting rods and pistons of internal-combustion engines, preferably of the multi-cylinder type, and its object is to provide means which insure proper lubrication of the various parts mentioned while the engine is running at high speeds.

This invention consists, in combination with the crank case of an internal combustion engine provided with a series of oil receptacles into which the lower ends of the connecting rods may dip in order to splash up the lubricating oil held in said receptacles and to beat the oil into a heavy mist which will be carried around by the crank shaft and the ends of the connecting rods; of means for fixing the diameter of this cylinder of oil mist and thereby the amount of lubricant thrown up into the lower ends of the cylinders, a shield for preventing the lubricating oil from being blown out of the receptacles below the connecting rods by the blasts of air caused by the high speed of the crank shaft and of the connecting rods attached thereto.

This invention further consists in forming inclined oil conveyers in the shields for preventing the blasts of air caused by the crank shafts from blowing the lubricant from the receptacles below the crank shafts, which conveyers shall carry longitudinally of the crank shafts the oil which has been intercepted by said shields and which was carried to said shields by the blasts of air.

In the accompanying drawings Figure 1 is a view, partly in elevation and partly a central vertical longitudinal section of a six cylinder internal combustion engine. Figs. 2 and 3 are vertical transverse sections of intercepters for controlling the diameter of the cylinder of oil mist carried around by the crank shaft of the engine. Fig. 4 is a vertical transverse section of a crank case of an engine of the type shown in the Fig. 1 on a larger scale. Fig. 5 is a perspective view of the intercepter of the oil mist carried around by the crank shaft. Fig. 6 is a perspective view of a shield for preventing the blast of air carried around by the crank shaft from blowing the lubricant out of the oil receptacles below the connecting rods. Figs. 7, 8, 9 and 10 are vertical transverse sections of modified forms of shields for intercepting the blasts of air. Fig. 11 is a section of one form of this shield showing a method of securing the oil conveyers to its rear side.

Similar reference characters refer to like parts throughout the several views.

In the engine shown in Fig. 1 the cylinders 1 are shown cast *en bloc* and slidable therein are pistons 2 provided with pins 3 on which are mounted the connecting rods 4. These rods engage the crank pins 5 of the crank shaft 6. These cylinders are connected to the upper part 7 of the crank case and may be formed integral therewith. The lower part 8 of the crank case is secured to the upper part in any desired manner and is so constructed that the lower portion 9 thereof constitutes the main reservoir for the lubricant and from it this lubricant may be drawn by means of the pump 10 of any desired construction, which pump may force the lubricating oil to the bearings of the crank shaft through the pipes 11. From these bearings the excess of oil flows down into oil pan 13 which is mounted in the lower portion of the crank case and is provided with a series of depressions 14, one below each connecting rod. The fingers 15 on the connecting rod caps enter the lubricant in these receptacles 14 and dash it up against the walls of the lower portion of the crank case and beat it into a very heavy mist which is carried around by the crank shaft and the lower ends of the connecting rod, lubricating the bearings of the crank pins, and being thrown out by centrifugal force up into the lower ends of the cylinders and onto the cam shaft and other movable mechanism within the crank case.

The amount of lubricant supplied to the bearings of the crank shaft is usually greatly in excess of that needed, in order to be on the safe side. The result is that the cylinder or drum of lubricant carried around by the crank shaft in the form of mist is larger than necessary to transmit no more than sufficient lubricant to the cylinders. This results not only in over-lubrication of the cylinders but also in a portion of the lubricant being drawn up past the piston rings into the explosion chamber during the charging strokes of the engine where it will be burned during the working strokes. The result is that heavy deposits of carbon and gums are left on the walls of the cylinder and its head, around the valves and the points of the spark plugs, thus interfering greatly with the effectiveness of the engine.

To prevent this excessive lubrication of the cylinders, intercepters may be mounted within the crank case in such a manner that they will serve to keep down the diameter of the cylinder of oil mist carried around by the crank shaft. One form of intercepters is shown in Figs. 4 and 5 and consists of a sheet metal plate 17 provided with holes 18 so that it may be secured to the wall of the crank case by means of rivets 19. The upper portion of this plate is bent to form the curve 20 and the lip 21 at the edge thereof. In order to permit the lower ends of the connecting rods to swing freely with the crank pins the gap and notches 22 may be formed in the curved portion 20 and lip 21 of this plate. A portion of the oil mist will be thrown out against the walls of the crank case and there condensed. The hole 23 may be formed in the curved portion 20 of this plate to permit this condensed oil to flow down. Two of these plates such as shown in Fig. 5 may be mounted end to end on one wall of the crank case of the engine shown in Fig. 1.

In Fig. 2 the modified form of intercepter plate 24 is formed with a curved upper portion 25 and the downwardly extending lip 26, while in Fig. 3 the plate 27 has gaps 28, the walls of which are bent up and small openings 29 are formed between the inclined portion 30 and the lip 31 to permit the intercepted oil to drop down. In both Figs. 2 and 3 the intercepters are shown spaced apart from the wall of the crank case by means of washers 33. In Fig. 3 the intercepter is shown secured to the upper portion of the crank case instead of the lower. In these three forms the larger drops of oil thrown out by the cranks will be dashed against the lips 21, 26 and 31 and be beaten into fine particles which are carried around by the air moving with the crank shaft.

This construction so far described for controlling the amount of lubricant passing to the cylinder is effective under normal conditions. In some cases, however, where the speed of the engine is high, lubricant is blown from the receptacle 14, materially changing the level of the lubricant therein. It thus occurs that while an engine will be properly lubricated up to a certain speed, the moving parts of the engine and the cylinders are not properly lubricated after such speed has been exceeded. These high speeds of engines cause the cylinders of air and oil mist, whose radius is that from the center of the crank shaft to the point of the finger 15, to often move at speeds varying from 70 to 100 miles per hour and these blasts are sufficient to change the level of the lubricant in these receptacles 14 by blowing a portion or all of the lubricant out of these receptacles and partially or entirely depriving the moving parts of the engine and the cylinders of lubricant. To prevent this lubricant from being thus affected by these blasts of air, means may be mounted within the crank case to intercept the outer layer of air carried around by the crank shaft and connecting rods. The structure of this device may be varied and five different forms and methods of attachment are shown in the drawings. In Figs. 4 and 6 a plate or shield 35 is shown secured to the wall of the lower portion 8 of the crank case, being held in position by means of feet 36. This shield will prevent the lubricant from being materially blown out of the receptacles 14. The air and oil mist thus cut off comprises a considerable amount of lubricant which may be permitted to flow back into the receptacle 14 from which it was thrown up or may be conveyed longitudinally to adjacent receptacles. The latter case is desirable when the lubricant is forced to the end bearings of the main crank shaft and flows directly into the two end receptacles 14. By forming the inclined troughs 38 on the rear side of the plates 35, the lubricant thus intercepted will be carried longitudinally of the crank case and preferably to the middle thereof, so that the intermediate receptacles 14 will be constantly supplied with lubricant. In Fig. 7, the shield 39 has inclined troughs 40 and is held in position by means of the screws 42 that secure the oil pan 43 to the lower part 44 of the crank case, this construction being that of the well known "Ford" car. In Fig. 8 the shield 45 is secured to the oil pan 13 by means of a foot 46. In Fig. 9 the shield 47 is flat and of considerable weight, being again secured in position by means of the screws 42 shown in Fig. 7. In Fig. 10 the shield 48 and its foot 49 are integral and are secured to the oil pan 13 by means of rivets 50. The inclined oil conveyers may be formed on the shields 35 in any desired manner, as by embossing them as shown in Fig. 6, or by securing them to the shield as shown in Fig. 11, where the foot 53 is secured to the shield 54 by means of rivets 55.

The level of the lubricant in the receptacles 14 and on the pan 13 generally may be determined in any desired manner and one method of providing for a constant communication between these oil receptacles and the main oil reservoir is shown in Fig. 1 where the holes 60 are formed in the pan 13, preferably at the bottom of the central longitudinal groove 61 in the oil pan shown in Fig. 4. The rear end 62 of the oil pan may be spaced from the lower part of the crank case to permit the lubricant to flow down to the crank case.

The small dam 63 may be placed below the front bearing of the engine to cause a pool of oil in which the timing gear 64 may run, the front bearing being provided with proper oil passages for this purpose.

In each engine the size and exact location of the shield to cause the oil in the receptacles 14 to remain at about the same level, may be determined by experiment but any shield which projects at an angle from the upper surface of the oil pan will be found to prevent more or less effectually change in the level of the lubricating oil in the receptacles 14 when the engine is running at a high speed.

I claim:—

1. In an internal combustion engine, the combination of a crank case having a depression to hold lubricating oil and into which the lower end of a connecting rod may dip to splash up the oil, and a shield placed longitudinally of the crank case and transversely across that end of the receptacle from which the connecting rod travels as it passes over said receptacles to prevent material amounts of oil from being blown out of said receptacle.

2. In an internal combustion engine, the combination of a crank case, a crank shaft and a connecting rod mounted therein, an oil receptacle mounted below the crank shaft and into which the connecting rod may dip to splash up the oil, and means spaced above the receptacle and positioned transversely thereto and longitudinally of the crank case to prevent the level of the oil being materially changed by blasts of air carried around by the crank shaft.

3. In an internal combustion engine, the combination of a crank case, a crank shaft and a connecting rod mounted therein, an oil pan mounted within the crank case below the crank shaft and formed with an oil receptacle into which the end on the connecting rod may dip to splash oil therefrom, and a shield mounted on said oil pan at one end of the receptacle and extending substantially parallel to the crank shaft.

4. In an internal combustion engine, the combination of a crank shaft and a connecting rod attached thereto, an oil receptacle below the crank shaft into which the connecting rod may dip, and means projecting up from the receptacle and transversely thereto and extending longitudinally of the crank case to prevent the air carried around by the crank shaft from materially changing the level of the oil in said receptacle.

5. In an internal combustion engine, the combination of a crank shaft and a connecting rod, an oil receptacle below the crank shaft into which the connecting rod may dip, an oil reservoir into which any excess of oil may freely flow, and means mounted adjacent said oil receptacle and projecting upwardly therefrom and extending longitudinally of the crank shaft to prevent the level of the oil therein being materially changed by the air carried around by the crank shaft.

6. In a multi-cylinder internal combustion engine, the combination of a crank shaft and connecting rods attached thereto, a series of oil receptacles below the crank shaft into which the connecting rods may dip, and a shield extending substantially parallel to the crank shaft adjacent said receptacles to prevent the level of oil therein being materially changed by the air carried around by the crank shaft.

7. In a multi-cylinder internal combustion engine, the combination of a crank shaft and connecting rods attached thereto, a series of oil receptacles below the crank shaft into which the connecting rods may dip, and a shield extending substantially parallel to the crank shaft adjacent said receptacles to prevent the level of oil therein being materially changed by the air carried around by the crank shaft, said shield being formed with notches to permit the connecting rods to pass.

8. In a multi-cylinder internal combustion engine, the combination of a crank shaft and connecting rods attached thereto a series of oil receptacles below the crank shaft into which the connecting rods may dip, and a shield extending substantially parallel to the crank shaft adjacent said receptacles to prevent the level of oil therein being materially changed by the air carried around by the crank shaft, said shield being formed with inclined oil troughs on its outer side to convey intercepted oil longitudinally of the crank case.

9. In a multi-cylinder internal combustion engine, the combination of a crank case, a crank shaft therein, connecting rods attached to the crank shaft, oil receptacles mounted below the crank shaft into which the connecting rods may dip to splash up oil and beat it into a mist which, together with air, is carried around by the crank shaft, intercepting means mounted on that side of the crank case toward which the oil is splashed to confine the diameter of the body of oil mist and air carried around by the crank shaft, and means mounted on the opposite side of the plane of the engine from said intercepting means to obstruct a portion of the air and oil mist carried around by the crank shaft.

10. In an internal combustion engine, the combination of a crank case, a cylinder in direct and constant communication therewith, a crank shaft in the crank case, a piston in the cylinder a connecting rod between the piston and crank shaft, an oil pan within the crank case below the crank shaft, and a shield adjacent that side edge of the oil pan from which the crank end of the connecting rod travels when the piston is at the crank end of its stroke, said shield projecting toward the crank shaft and extending substantially parallel thereto.

11. In a multi-cylinder internal combustion engine, the combination of a crank case formed of two parts bolted together, a crank shaft and connecting rods mounted therein, said crank case having oil receptacles into which the lower ends of the connecting rods may dip to splash up oil, and a shield comprising a strip of metal having one edge formed to receive the bolts employed to secure the two parts of the crank case together and positioned at that side of said receptacles from which the lower ends of the connecting rods travel at the end of the working stroke, the other edge of said strip extending toward the crank shaft to intercept a portion of the air carried around thereby and prevent said air from materially changing the level of the oil in said receptacles.

12. In an internal combustion engine, the combination of a crank case, a cylinder in constant communication therewith, a crank shaft in the crank case, means for supplying oil to the crank shaft which oil is beaten into a mist and carried around by the crank shaft, and a shield substantially parallel to the crank shaft adjacent that side of the crank case from which the crank travels at the beginning of the compression stroke, said shield serving to interrupt a portion of the body of air and oil mist carried around by the crank shaft.

ERNEST M. WHITE.